United States Patent
Trent, III et al.

(10) Patent No.: US 10,974,180 B2
(45) Date of Patent: Apr. 13, 2021

(54) COOKING OIL TREATMENT FILTRATION AID AND METHOD

(71) Applicant: DuraFry Solutions, LLC, Raleigh, NC (US)

(72) Inventors: William E. Trent, III, Raleigh, NC (US); Mounib Aoun, Raleigh, NC (US)

(73) Assignee: DuraFry Solutions, LLC, Raleigh, NC (US)

( * ) Notice: Subject to any disclaimer, the term of this patent is extended or adjusted under 35 U.S.C. 154(b) by 123 days.

(21) Appl. No.: 15/690,682

(22) Filed: Aug. 30, 2017

(65) Prior Publication Data

US 2019/0060810 A1    Feb. 28, 2019

(51) Int. Cl.
| | | |
|---|---|---|
| *B01D 37/02* | (2006.01) | |
| *C11B 3/00* | (2006.01) | |
| *A47J 37/12* | (2006.01) | |
| *A23D 9/007* | (2006.01) | |
| *A23D 9/04* | (2006.01) | |
| *C11B 3/10* | (2006.01) | |

(52) U.S. Cl.
CPC .............. *B01D 37/02* (2013.01); *A23D 9/007* (2013.01); *A23D 9/04* (2013.01); *A47J 37/1223* (2013.01); *C11B 3/001* (2013.01); *C11B 3/008* (2013.01); *C11B 3/10* (2013.01)

(58) Field of Classification Search
CPC ........... C11B 3/008; C11B 3/001; C11B 3/10; B01D 37/02; A23D 9/007; A23D 9/04; A47J 37/1223
See application file for complete search history.

(56) References Cited

U.S. PATENT DOCUMENTS

| | | | |
|---|---|---|---|
| 4,112,129 A | 9/1978 | Duensing et al. | |
| 4,681,768 A | 7/1987 | Mulflur et al. | |
| 4,764,384 A * | 8/1988 | Gyann | C11B 3/10 426/417 |
| 4,880,652 A | 11/1989 | Regutti | |
| 4,913,922 A * | 4/1990 | Hawkes | C11B 3/008 426/417 |
| 4,988,440 A | 1/1991 | Bernard et al. | |
| 5,597,600 A | 1/1997 | Munson et al. | |
| 6,187,355 B1 * | 2/2001 | Akoh | B01D 15/00 106/38.3 |
| 2008/0213448 A1 | 10/2008 | Feinberg et al. | |
| 2018/0185816 A1 * | 7/2018 | Fleming | B01J 20/10 |

FOREIGN PATENT DOCUMENTS

| | | |
|---|---|---|
| WO | 2016034897 A1 | 3/2016 |
| WO | 2017040210 A1 | 3/2017 |

OTHER PUBLICATIONS

"Diatomaceous Earth." Wikipedia, Jun. 6, 2017, https://en.wikipedia.org/wiki/Diatomaceous_earth. Accessed Jun. 22, 2017.
"Synthetic Magnesium Silicate." Wikipedia, Dec. 6, 2015, https://en.wikipedia.org/wiki/Synthetic_magnesium_silicate. Accessed Jun. 26, 2017.
PCT Search Report from Corresponding Application PCT/US18/44992.
TESTO AG, Field Guide Cooking Oil Measurement, www.testo.com, Jul. 2009, pp. 30-31, Lenzkirch, Germany.

* cited by examiner

*Primary Examiner* — Cephia D Toomer
(74) *Attorney, Agent, or Firm* — James G. Passé; Passé Intellectual Property, LLC

(57) ABSTRACT

A product matter of generally expanding the life of edible cooking oil used to deep fry wherein a combination of diatomaceous earth and anhydrous magnesium silicate are used as a fry and filtering aid.

2 Claims, No Drawings

COOKING OIL TREATMENT FILTRATION AID AND METHOD

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to the treatment of cooking oils. In particular, it relates to filtering materials for use in filtering cooking oil that significantly extends the useful life of the cooking oil.

Description of Related Art

The use of fryers in restaurants for cooking a wide variety of foods extends from |fast food| type restaurants, to upscale restaurants and everything in between. Frying is fast, easy, and most people find the taste of fried food pleasant. Many fairs and restaurants pride themselves on the wide variety of fried foods they serve.

In the frying of foods, large amounts of edible cooking oil are heated in cookers (fryers) to temperatures in a range of about 350° F. to about 375° F. The food is usually completely immersed in the hot oil fryer until the food is cooked and usually a golden color is achieved on the outside of the food. Some oil is absorbed by the cooked food with each use and normally there is an additional amount of oil needed to be added each day to keep the cooker full of cooking oil. The addition of oil is only done to fill up the fryer to the recommended level so it will be able to operate properly. This normally runs about a 10-20% addition a day. Because of the high temperatures and continued use of the oils, free fatty acids (FFA) are formed and the oil begins to discolor. FFA imparts an off taste to food and darker oils can discolor the food they are cooking, leading to a substandard looking and tasting food product. The addition of new oil to top off the fryer helps extend life, but only by an additional couple of days or so.

If nothing is done to treat the oil, it needs to be totally replaced in as little as 3 days, which is very expensive. Depending on the usage, sometime the oil is replaced on a daily bases. Filtration of the oil on a regular basis (once a day or more) has been used for decades and does add an additional couple of days to the oil life. Filtration eliminates impurity and particulate in the oil, therefore it extends the life of the oil. Other approaches to extend the life of oil are used and known. They include filtration aids that are added to the oil during filtration and life extenders added to the oil during the cooking process. Still, even with the known treatments, only a few more days are added to oil life before the oil must be changed. Each day of extended life, however, can add up to millions of dollars overall to the restaurant market. Large fast food chains spend tens of millions of dollars a year on cooking oil and any improvement in oil life translates into enormous dollar savings.

BRIEF SUMMARY OF THE INVENTION

The present invention relates to the discovery of a product that extends the life of edible cooking oil for at least a month, and can even extend oil life up to a year or more when the cooking oil is topped off on a daily basis. The composition contains just 2 active ingredients: edible diatomaceous earth and magnesium silicate and is used as a filtration aid which proves a factor improvement in the removal of impurities and particulates compared to previous filtration aids.

Accordingly, in one embodiment, there is an edible oil filtration aid composition useful to extend the life of edible cooking oils comprising, in parts by weight:
  a) edible diatomaceous earth, 5 to 95 parts; and
  b) edible anhydrous magnesium silicate, 5 to 95 parts.

In another embodiment, there is a method of extending the useful life of an edible oil being used in a fryer during oil filtration comprising:
  a) adding a composition in parts by weight to the edible oil in the fryer comprising:
    i. edible diatomaceous earth, 5 to 95 parts; and
    ii. edible anhydrous magnesium silicate 5 to 95 parts;
  in an amount of about 0.1 ounce to about 3 ounces of composition per 16 ounces of oil for every about 4 to about 12 hours of continuous use of the oil; and
  b) filtering the oil and returning the oil to the fryer.

DETAILED DESCRIPTION OF THE INVENTION

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals, if any, are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means any of the following: "A; B; C; A and B; A and C; B and C; A, B, and C". An exception to this definition will occur only when a combination of elements, functions, steps, or acts are in some way inherently mutually exclusive.

The drawings featured in the FIGURES, if any, are for the purpose of illustrating certain convenient embodiments of the present invention, and are not to be considered as limitation thereto. The term "means" preceding a present participle of an operation indicates a desired function for which there are one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term "edible cooking oil" refers to those oils that are normally used and approved for the frying of foods especially in a french fryer (fryer) wherein food is immersed in the oil. Examples of cooking oils include vegetable cooking oils such as palm, corn, soybean, sunflower, canola, and the like and oils of animal origin such as lard, duck fat, fish oil, and the like. It is anticipated that the oils used herein are designed for repeated use and not single use frying.

As used herein, the term "extend the life" refers to the composition of the present invention being added to a cooking oil during filtration in order to extend the time period before the cooking oil needs to be drained from the fryer and thrown away. Normally, replacement is from about 3 to 10 days but with the present composition it can be double, triple, or as much as a year or more.

As used herein, the term "edible diatomaceous earth" refers to the fossilized remains of diatoms, a type of hard shelled algae. It is ground to a form that is approved by the FDA for consumption. The typical chemical composition is 60 to 90% silican, 2 to 4% alumina, and 0.5 to 2% iron oxide.

As used herein, the term "edible anhydrous magnesium silicate" refers to anhydrous magnesium silicate which has been powdered and treated such that it is approved by the FDA for consumption.

As used herein, the term "composition" refers to a composition comprising or consisting essentially of 5 to 95 parts edible diatomaceous earth and 5 to 95 parts edible anhydrous magnesium silicate in parts by weight. In one embodiment they are both 25 to 75 parts each and in another 40 to 60 parts. In another embodiment, the composition comprises about 100 parts by weight of the two ingredients. It is understood that the present invention comprises only two active ingredients but can include those types of processing agents which are normally included with additives to edible cooking oil. In use, about 0.1 ounce to about 3 ounces of the composition are added to each 16 ounces of cooking oil for every 4 to about 12 hours of continuous use during filtration of the oil. In one embodiment the edible oil is filtered on a regular schedule, such as daily or after use. The product is added to the oil during the filtration process. Basically, all unwanted and oxidized particles attach to the product, and therefore they are eliminated from the oil. All the impurity and particles are accumulated to the filter, and the clean oil is pumped back into the fryer. In another embodiment, oil is added to the edible oil after use to "top off" the oil to a pre-determined amount. This process of topping off further extends the life beyond what would normally be expected for such process. In one embodiment, the composition is about a 50/50 mixture by weight of the active ingredients.

As used herein, the term "processing agent" refers to those things which are added to the composition to improve their use, rather than additional items which further improve the life extension. Examples include, but are not limited to, at least one of a filler, anti-caking agent, a flow agent, an anti-dusting agent, a dispersion agent, a wetting agent, and an edible oil.

As used herein, the term "unit dose packets" refers to placing the composition in a single container such that the entire contents can be placed in the oil for use during filtration. It can also be, wherein, the container, as well, can be placed in the oil and dissolve thus negating the need to open the package.

In using the composition, the regular filtration schedule is followed as is topping off of oil, where needed, to keep the fryer at a predetermined level. The composition is used about every 4 to 12 hours for filtration or as needed depending on the use of the fryer.

Example 1

A composition was formulated using 50% Edible Magnesium Silicate and 50% Edible Diatomaceous Earth.

Example 2

The following test was done with the composition of Example 1.

In this example, a chicken restaurant that fries chicken in hydrogenated soybean oil in a 30 pound commercial fryer at a temperature of approximately 350° F. is utilized. The fry oil is normally completely changed every 1-2 days and is unusable after that period of time. The fry oil was, in this example, treated and filtered each day, twice per day, due to heavy frying activity with 2% wt. based upon the weight of the frying oil, with a blend of 50% Edible Magnesium Silicate and 50% Edible Diatomaceous Earth of Example 1 added to the oil during filtration. The oil was topped off as needed.

The test was performed over an 11-month period. The oil was not changed (nor needed to be changed) during the test. The oil was chemically tested at 30 days.

During the 11-month testing, the food (chicken) was visually inspected for color, specifically focusing on any discoloration (darkening) browning, or caramelization of the skin.

Tests were also performed on the oil during the frying phase period and tested for Free Fatty Acids (FFA) Foaming, using the titratable soap methodology, and photometric color transmission.

The results indicate that the composition of Example 1 provides excellent results pertaining to all aspects of oil quality, lengthening the days of frying with the oil significantly, which allows the oil to be continually used over the industry standard of disposal which typically is 3-4 days before discard due to poor oil quality, brownish to dark colorization, and increased FFA content. This creates a tremendous economic savings for the operator saving money on additional oil purchases, disposal and safety aspects of hot oil removal and labor clean up. Additionally, it was found that using the composite blend, carbon and food content was easier to remove and clean from the fryers than if no frying extender aid was added.

The overall appearance, oil reduction, FFA, color transmittance, and foaming were shown to achieve superior results over similar frying oil aids in the market, specifically related to length of time in use.

Data:
% Free Fatty Acids
Day 1=0.48%
Day 15=0.99%
Day 30=1.25%
Photometric Color Transmittance:
Day 1=20.0
Day 15=60.0
Day 30=62.0
Titratable Soap Value (PPM)
Day 1=<100 ppm
Day 15=<100 ppm
Day 30<200 ppm Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A method of extending the useful life of an edible oil being used in a fryer during oil filtration in a filtration device consisting of:
   a) adding in parts by weight to the edible oil in either the fryer or in the filtration device, an edible oil filtration aid consisting of:
      i. food grade diatomaceous earth, 25 to 75 parts;
      ii. food grade anhydrous magnesium silicate, 25 to 75 parts; in an amount of about 0.1 ounce to about 3 ounces of filtration aid per 16 ounces of oil for every about 4 to about 12 hours of continuous use of the oil; and
      iii. a processing agent selected from the group consisting of at least one of an anti-caking agent, a filler, a flow agent, an anti-dusting agent, a dispersion agent, a wetting agent, and an edible oil; and
   b) filtering the oil through a filter in the filtration device and returning the oil to the fryer.

2. The method of extending the useful life of an edible oil according to claim 1 wherein the filtration aid is blended with edible oil.

* * * * *